United States Patent
Bloomfield

(10) Patent No.: US 6,917,722 B1
(45) Date of Patent: Jul. 12, 2005

(54) CREATION, TRANSMISSION AND RETRIEVAL OF INFORMATION

(75) Inventor: Mark E. Bloomfield, London (GB)

(73) Assignee: NCR Corporation, Dayton, OH (US)

( * ) Notice: Subject to any disclaimer, the term of this patent is extended or adjusted under 35 U.S.C. 154(b) by 539 days.

(21) Appl. No.: 09/666,655

(22) Filed: Sep. 20, 2000

(30) Foreign Application Priority Data

Sep. 20, 1999 (GB) ............................................. 9922214

(51) Int. Cl.⁷ ............................ G06K 9/22; H04N 1/00
(52) U.S. Cl. ...................... 382/313; 382/314; 382/317; 358/473
(58) Field of Search ................................ 382/314, 317, 382/120–122, 188, 313; 358/473

(56) References Cited

U.S. PATENT DOCUMENTS

| | | | |
|---|---|---|---|
| 3,976,973 A | | 8/1976 | Martin et al. |
| 5,548,092 A | * | 8/1996 | Shriver .................... 178/19.01 |
| 5,574,804 A | * | 11/1996 | Olschafskie et al. ........ 382/313 |
| 5,905,251 A | * | 5/1999 | Knowles ................. 235/472.01 |
| 6,081,629 A | * | 6/2000 | Browning ................... 382/313 |
| 6,247,092 B1 | * | 6/2001 | Tanaka et al. .............. 710/260 |
| 6,321,991 B1 | * | 11/2001 | Knowles ................. 235/472.01 |
| 6,456,749 B1 | * | 9/2002 | Kasabach et al. ........... 382/314 |
| 6,544,295 B1 | * | 4/2003 | Bodnar ....................... 709/219 |
| 2003/0093384 A1 | * | 5/2003 | Durst et al. .................. 705/64 |

FOREIGN PATENT DOCUMENTS

| | | | | |
|---|---|---|---|---|
| JP | 10075290 A | * | 3/1998 | .......... H04M/1/272 |
| JP | 11177752 A | * | 7/1999 | ............ H04N/1/00 |
| WO | 9803923 | | 1/1998 | |

* cited by examiner

Primary Examiner—Jon Chang
(74) Attorney, Agent, or Firm—Gregory A. Welte

(57) ABSTRACT

A hand-held control device (10) for controlling a terminal (30) connectable by a communications network to an addressed resource. The device (10) comprises address input means for scanning and recognizing a text address (26) of the resource, such as a URL, e-mail address or telephone number, and command output means for uploading address information from the device (10) to the terminal (30) whereupon the terminal (30) is caused to connect to the addressed resource.

19 Claims, 2 Drawing Sheets

CREATION, TRANSMISSION AND RETRIEVAL OF INFORMATION

BACKGROUND OF THE INVENTION

This invention relates to the creation, transmission and retrieval of information. More specifically, the invention resides in a device for controlling an information-loading terminal such as a PC or other computing/communications device running a browser, and related methods for use of such a device and system. The invention particularly contemplates techniques for locating and loading information from resources such as the Internet, and for creating and transmitting information.

The advance of information technology has placed information on almost any topic at the disposal of every suitably-equipped computer user. The Internet especially is undergoing explosive growth, with the result that new web pages and Internet-based services are proliferating in every field.

Web pages can simply contain reference information but increasingly provide interactive facilities for the provision of information, entertainment and Internet-based services. For instance, many banks now offer customers the option of on-line home banking over the Internet. Large stores offer home delivery services, where a customer places an order for specific goods such as groceries over the Internet and the ordered goods are subsequently delivered to the customer's home.

As more information seekers, such as customers, have become familiar with the possibilities offered by the Internet and as more information providers, such as vendors, have appreciated how indispensable an effective Internet presence has therefore become, URLs identifying Internet resources have proliferated. In fact, it is becoming somewhat rare to see literature such as a brochure, an advertisement or a corporate letterhead that does not recite at least one URL relating to the content of the literature.

Whilst this discussion will major upon Internet issues, it should also be noted that there has been a corresponding growth in the allied technology of e-mail, and hence a similar if not greater proliferation of e-mail addresses.

Various Internet-enabled terminals are threatening the hegemony of the PC as will be discussed below, but it is still the case for most users that Internet access requires use of a PC. Unless the PC is left on all the time and is connected to the Internet by a fast and expensive telecommunications link such as ISDN, Internet access requires the PC to be booted up, following which a dial-up connection to the user's ISP has to be made and only then can the desired web page be searched for or entered. Even then, there could be layers of menus to be negotiated, possibly exacerbated by security measures, each involving download time in what has come to be known as the 'world wide wait'.

For all of these reasons, it is quite common for several minutes to elapse before an Internet-connected PC is actually ready to help the user with his or her query. This delay discourages the user from accessing the Internet resources from which he or she could benefit and, if the information requested is time-critical such as a bus or train timetable, can make the system too slow to be of practical use.

It will therefore be clear that many laborious steps can lie between reading, say, a URL in a manufacturer's product brochure and successfully obtaining relevant information from the web site thus identified. The problem is worsened because transcription errors often occur. URLs for specific web pages can be fiendishly complex, impossible to remember and difficult to write or to type with the necessary accuracy. The user is then presented with the alternatives of checking and re-entering the URL or, if that doesn't work, searching the Internet for the correct URL with the aid of a search engine. Searching in this way offers no guarantee of success, could misdirect the user to a similar-sounding site, and will almost inevitably require the user to sift through many irrelevant hits. The final alternative, which is to log off and forget about accessing the URL, becomes all too tempting after the user has endured the steps above without success.

In the e-mail scenario, an incorrectly-entered e-mail address could have serious consequences if, say, confidential or otherwise sensitive information is sent to the wrong person. This is worryingly easy to do where many e-mail addresses are similar, an example being personal e-mail addresses within an organization that may differ from each other only in the order of the addressee's initials.

Whilst reference is made above to the problems of a PC, those skilled in the art will know that other computing/communications devices can be used as terminals instead. Such devices are becoming more widespread and promise to continue doing so, driving the next generation of computing within the home and indeed elsewhere as resistance to the PC format is encountered and simpler, more intuitive but no less powerful alternatives come to fruition. For example, existing communications devices such as Internet-enabled mobile telephones, PDAs, ATMs, kiosks and point of sale terminals are contemplated for the purposes of the invention, as are portable screens, digital televisions and set-top boxes, data appliances, desk-top telephones and writing instruments if suitably equipped. The invention can also employ future devices such as so-called street screens, chat booths and retail wands. For convenience, all of these computing/communications devices will be referred to collectively hereinafter as terminals, unless the context demands otherwise.

The abovementioned terminals aim to simplify Internet access by providing a simple alternative to a PC but still suffer from problems. For example, Internet access if just one of several functions that such terminals offer and so a succession of control inputs are necessary to select and to effect Internet access from among the various functions. Also, whilst even the sleekest user interface makes it simple enough to access a web page when that page has been visited before and bookmarked in a browser application, the story is different where the URL has to be entered for the first time. Unless the user happens across a new URL as a link from another page when 'surfing the web', the user will have to key in the URL with complete accuracy, using an interface that may be ill-equipped for fast and accurate keyed entry.

SUMMARY OF THE INVENTION

Against this background, the invention resides in a hand-held control device for controlling a terminal connectable by a communications network to an addressed resource, the device comprising address input means for scanning a text address of the resource and command output means for uploading address information from the device to the terminal and causing the terminal to connect to the addressed resource. This device enables a user seeing a URL or other text resource address on, for example, an advertisement to scan in that address and, with a single upload command and without error of transcription, to launch a browser to access the resource identified by the URL.

The invention also encompasses the related method of controlling a terminal connectable by a communications network to an addressed resource, the method comprising scanning a text address of the resource uploading address information to the terminal, and causing the terminal to connect to the addressed resource. Where the addressed resource is an Internet resource the method can include the terminal launching a browser and using that browser to load the Internet resource. This aspect of the method can extend to displaying, viewing and optionally interacting with the Internet resource by means of the terminal.

The device preferably includes recognition means for recognizing the nature of the addressed resource from the format of the scanned text address, for example a URL, e-mail address or telephone number. This way, an application launch code can be retrieved that is suitable to launch an application on the terminal appropriate to the nature of the addressed resource, for example a browser application if the scanned text address is a URL. The application launch code can be appended to the address information before upload to the terminal, and so is suitably stored with the address information until upload to the terminal.

In elegant arrangements of the invention that greatly simplify the user interface, the device further includes control means that respond to the orientation and/or movement of the device. Such control means can include a tilt switch or an array of tilt switches arranged to sense orientation of the device. It is also possible to employ an accelerometer or an array of accelerometers arranged to sense orientation or movement of the device. Accelerometers, in particular, can be used to sense movement of the head end of the device when the device is used as a writing instrument.

The control means can activate a function of the device in accordance with the orientation or movement of the device, or in accordance with a predetermined sequence of orientations or movements of the device.

For use of the device as a writing instrument, the head end of the device suitably includes a stylus that is preferably retractable so as not to hinder other operations such as scanning performed using the head end. Similarly, the device is preferably of generally pen-like size and shape, having an elongate barrel terminating distally in a head end. The head end may define a surface that is obliquely angled to the longitudinal axis of the barrel, this surface including a scanner of the address input means.

Conveniently, the device can include a display providing a confirmatory display of a scanned address. To enable the device to collect resource addresses that the user encounters in day-to-day life, the device advantageously includes means for storing a plurality of resource addresses. In that event, the device suitably includes means for displaying all of the stored resource addresses and means for selecting an appropriate one of the stored and displayed resource addresses.

The invention extends to the combination of a device as defined herein and a terminal adapted to download address information from the device. The terminal suitably includes means for recognizing, verifying and acting upon the command data received from the device.

The device of the invention can include means for generating a text file as a user writes with the device, and/or means for generating a graphics file as the user writes or draws with the device. These aspects of the invention can also be expressed as a hand-held control device for controlling a terminal, the device comprising command output means for uploading a text or graphics file from the device to the terminal, wherein the device includes sensor means arranged to sense movement of the device when the device is used as a writing or drawing instrument, and means for generating the text or graphics file as a user writes or draws with the device. Where the device is adapted for use in controlling a terminal connectable by a communications network to an addressed resource, the command output means of the device suitably includes means for causing the terminal to connect to the addressed resource and to convey the text or graphics file as message information to that resource.

The related method of controlling a terminal comprises using a hand-held device as a writing or drawing instrument, sensing movement of the device to generate a text or graphics file as a user writes or draws with the device, and uploading the text or graphics file from the device to the terminal. Where the terminal is connectable by a communications network to an addressed resource, the method suitably comprises using the hand-held device to cause the terminal to connect to the addressed resource and to convey the text or graphics file as message information to that resource.

BRIEF DESCRIPTION OF THE DRAWINGS

In order that this invention can be more readily understood, reference will now be made, by way of example, to the accompanying drawings in which.

DETAILED DESCRIPTION

Figure 1:
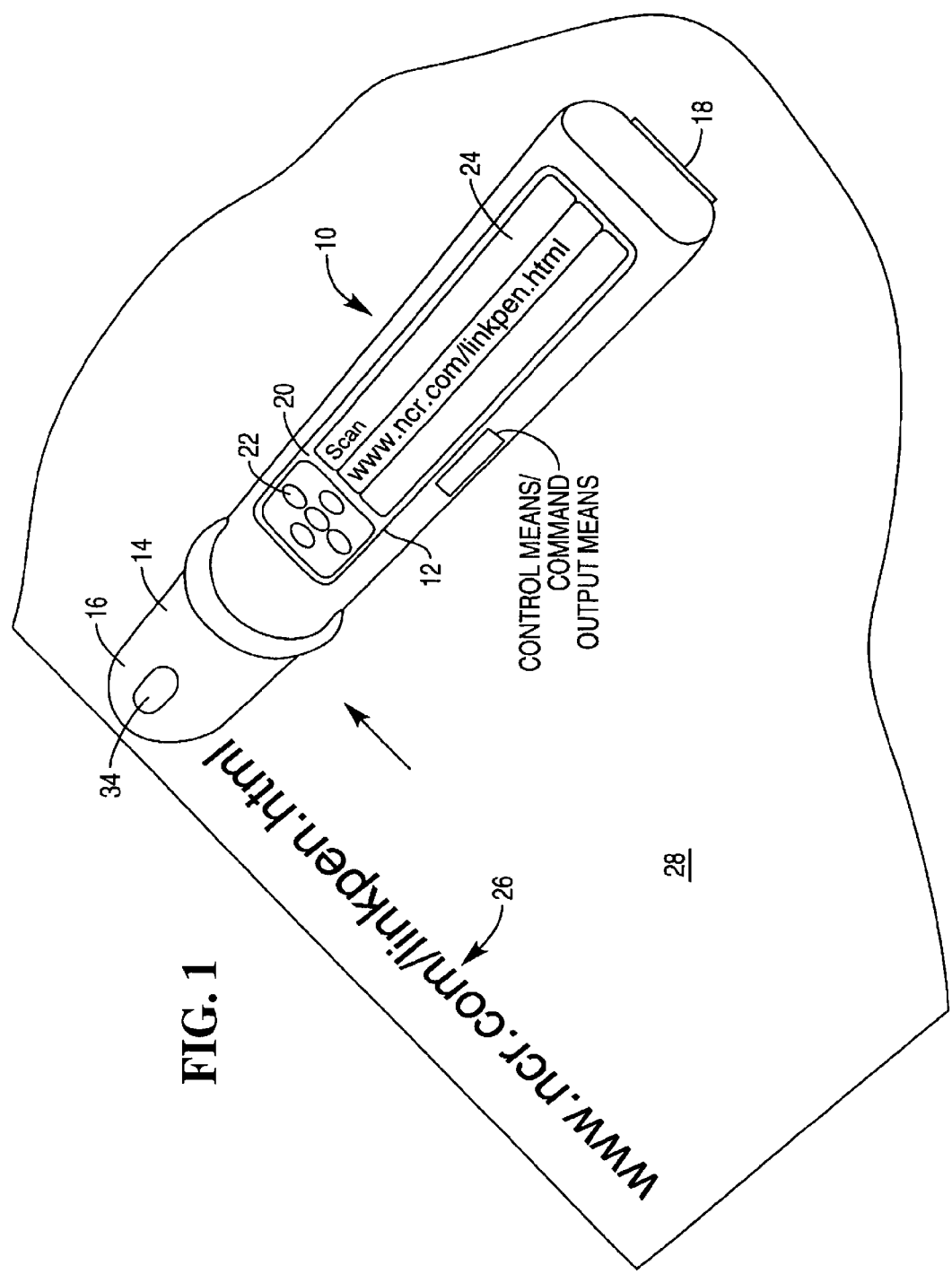
FIG. 1 is a schematic perspective view of a currently-preferred embodiment of the invention in use scanning a URL.

In the drawings, a command device 10 is of generally pen-like size and shape and can be gripped in one hand and manipulated in the manner of a writing instrument. The device therefore has an elongate barrel 12 terminating distally in a tapered head end 14 skin to the point or nib or a writing instrument, the head end 14 defining a surface 16 that is obliquely angled to the longitudinal axis of the barrel 12. The pen analogy is continued by a pocket clip 18 that is attached resiliently to the proximal end of the barrel 12 and extends distally along one side of the barrel 12.

One the side of the barrel 12 opposed to the clip 18, the barrel 12 is cut away to define a generally flat, oblong display area 20. The distal end of the display area 20 is occupied by an array of LEDs 22 indicating the operational status of the device 10 by their different colors and positions within the array. Much of the remainder of the display area 20 is occupied by a three-line dot matrix LCD display 24.

The head end 14 includes input means in the form of a scanner and output means in the form of a transmitter such as an IR or RF transmitter. Well-known scanner and transmitter technologies can be used in the invention, so there is no need to elaborate here save to say that the device 10 includes a processor controlling scanner and transmitter drivers, and memory for storing a scanned image as well as for providing the operational memory requirements of the processor. Different types of memory could be employed for these different purposes, although there is no need to distinguish between them for the purposes of this description. The processor also controls display drivers for the LEDs 22 and the LCD display 24, although it will be apparent that some processors can offer memory and driver facilities integrally and so could be used instead.

Referring specifically now to FIG. 1, the device 10 is shown with its head end 14 having been dragged or wiped by a user across a URL 26 printed on a brochure 28 or the like. For this purpose, the device 10 has been held at such an angle that it presents the angled surface 16 at the head end 14 flat to the surface of the brochure 28 on which the URL 26 is printed. A scanned image representative of the URL 26 has been acquired by the scanner under control of the processor and has been stored in the memory of the device 10.

The processor has run a proprietary OCR software application on the stored scanned image and has written the resulting text to the LCD display 24, where it appears on the second line below a status confirmation word 'Scan' on the first line. These lines of text appear as confirmation to the user that the device 10 is in a scanning mode, and that the URL has been scanned correctly. If it has not, the device 10 can be wiped across the URL 26 again to clear the memory and repeat the procedure.

An appropriate one or more of the LEDs 22 can light as further confirmation that the device 10 is in the scanning mode and/or that a scan has been completed. Should the URL 26 be exceptionally long, the confirmatory text on the second line of the display 24 can extend onto the third line.

In much the same way that a knowledgeable human reader is able to tell apart a web page address, an e-mail address or a telephone number in view of their different conventional formats, the processor is capable of recognizing the type or nature of the scanned text, if suitably programmed with the simple formatting rules that apply to web page addresses, e-mail addresses and telephone numbers. The processor can then call from memory an application launch code suitable to launch the application appropriate to the detected format of text, such as a browser or e-mail program. This code can be appended to the stored identity of the scanned text to complete the command data necessary to both launch the application and access the desired resource using that application.

Figure 2:
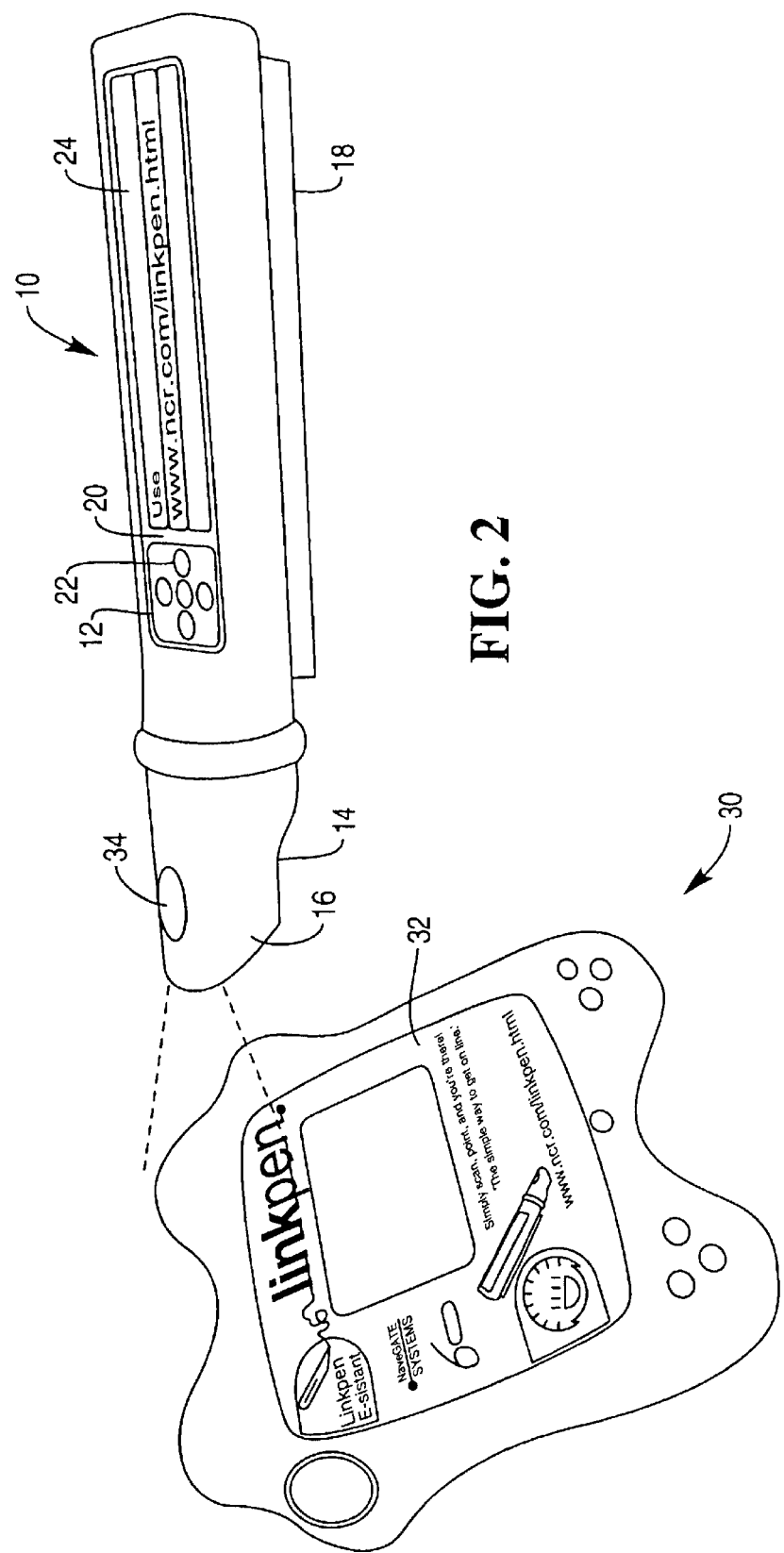
FIG. 2 is a perspective view of the embodiment of FIG. 1 in use transmitting command information to a terminal in the form of a hand-held PDA, the PDA then launching a browser and loading and displaying the web page identified by the URL scanned in FIG. 1.

So, once identified by the OCR application and, if necessary, type-recognized by the processor, the URL 26 is stored in the memory with any necessary application launch code until the time comes to transmit the URL 26 and other command data to a terminal 30 as shown in FIG. 2. Here, the head end 14 of the device 10 has been pointed at the terminal 30 and the transmitter in the head end 14 has been activated in a manner that will be described later. In this instance, the terminal 30 is a PDA, although any suitable terminal could be used instead. The first line of the LCD display 24 now recites the word 'Use' to confirm the new status of the device 10 and the second line again recites the URL 26 as confirmation of the resource that will be loaded and displayed by the terminal 30.

In FIG. 2, the command data has been transmitted to a suitable receiver on the terminal 30 using well-known modulation and transmission techniques. Following demodulation and decoding operations performed by the terminal 30, the terminal 30 has recognized, verified and acted upon the command data by launching a browser and by using that browser to load a web page 32 corresponding to the scanned URL 26. The user can then view and, if desired, interact with the displayed web page 32 in any manner that may be permitted by the terminal 30, in this instance using a touch screen display on the front of the terminal 30 to enter the appropriate command inputs via icons or a virtual keypad on the display.

It will be evident from the foregoing that the device 10 is advantageously small and yet that the user must somehow enter control inputs to start scanning, start transmission and so on. Rather than burden the device 10 with an unworkable user interface such as impossibly small buttons that could require another pen-like implement to operate, the device 10 preferably includes control means that respond to the orientation and/or movement of the device 10. This control means can be wholly internal as it requires no user manipulation. So, this feature simplifies the device 10 to the benefit of cost and reliability, allows more of its external surface to be dedicated to the purposes of display and manipulation, and gives aesthetic and functional designers of the device 10 greater freedom.

Such control means could be as simple as a tilt switch or an array of tilt switches arranged to sense orientation of the device 10, whereby the processor taking inputs from the resulting signals enables and/or triggers certain functions in accordance with the orientation of the device 10 or in accordance with a predetermined sequence of such orientations. In an over-simplified example, the 'Scan' mode could be enabled whenever the device 10 is oriented to present its angled head end surface to horizontally-disposed text, the transmit or 'Use' mode could be enabled whenever the device 10 is approximately horizontal, or the device 10 can be in an off or dormant mode when the device 10 is vertical, as if clipped in a pocket.

The tilt switch or tilt switch array could be replaced or supplemented by an accelerometer or an array of accelerometers. Apart from sensing orientation and possibly also movement or a sequence of movements for the purposes of control, accelerometer-based control means can sense movement of the head end 14 of the device 10 if the device 10 is used as a writing instrument. For this purpose, the head end 14 of the device is suitably equipped with a retractable stylus (not shown) that can be advanced or retracted by use of a button 34 at the head end 14.

With adequate memory and processing power in the device 10, the movement of the head end 14 detected by the accelerometer(s) can be analyzed and understood by the processor. If the user is writing, it would be possible to generate a text file in the memory as the user writes with the device 10. This text file can constitute a message that can be sent as an e-mail message or attachment upon its transmittal to the terminal 30 with an e-mail address and suitable command data, preferably after displaying, checking and, if necessary, editing the text on the terminal 30. Of course, if the user is writing or drawing, it would also be possible to record the movement of the head end 14 as the graphics file and to upload that file to the terminal 30 for display, checking and/or onward transmission.

The invention has the benefit that the device 10 can interact with many different terminals, subject to the usual compatibility issues, and can use those terminals to access any resource that the terminal can offer either internally or through a communications network. In summary, the device 10 enables easy collection of resource addresses, ensures accurate identification of those resource addresses, and permits convenient operation of a terminal Many variations are possible without departing from the inventive concept. For example, those skilled in the art will know that whilst IR technology is directional to the extent of requiring some attempt at pointing the device 10 and, usually, a line of sight between the device 10 and the terminal 30, RF technology is generally omnidirectional and so an RF-enabled device 10 could be used in any orientation and out of sight of the terminal 30, not necessarily even in the same room. Either transmitter technology can be used in the invention but RF is preferred for this reason.

The memory within the device 10 is preferably large enough to store several URLs, in which case the device 10 includes means for displaying all of the stored URLs, for example by being scrolled line-by-line on the LCD display 24, and means for selecting an appropriate one of the stored and displayed URLs when it is desired to access the resource represented by that URL. The necessary control inputs can be effected via the aforementioned orientation and/or movement sensors.

Whilst the invention provides great benefit in the Internet environment, it is not essential that the information resource is an Internet resource: information could be held on an intranet or in a database of any description. More generally, as has been mentioned, the invention can be used to acquire and identify the unique address of other resources, such as a telephone number, and to cause a suitable terminal to dial that number.

In view of these and other variants, reference should be made to the accompanying claims rather than the foregoing specific description in interpreting the scope of the invention.

What is claimed is:

1. A hand-held control device for controlling a terminal connectable by a communications network to an addressed resource, the device comprising:
    address input means for scanning a text address of the resource;
    command output means for uploading address information from the device to the terminal and causing the terminal to connect to the addressed resource; and
    recognition means for recognizing the nature of the addressed resource from the format of the scanned text address.

2. A device according to claim 1, further comprising means for retrieving an application launch code suitable to launch an application on the terminal appropriate to the nature of the addressed resource.

3. A device according to claim 2, further including means for appending the application launch code to the address information before upload to the terminal.

4. A device according to claim 3, further comprising means for storing the address information with an associated application launch code until upload to the terminal.

5. A hand-held control device for controlling a terminal connectable by a communications network to an addressed resource, the device comprising:
    address input means for scanning a text address of the resource;
    command output means for uploading address information from the device to the terminal and causing the terminal to connect to the addressed resource; and
    control means responsive to the orientation and/or movement of the device, the control means includes a tilt switch or an array of tilt switches arranged to sense orientation of the device.

6. A hand-held control device for controlling a terminal connectable by a communications network to an addressed resource, the device comprising:
    address input means for scanning a text address of the resource;
    command output means for uploading address information from the device to the terminal and causing the terminal to connect to the addressed resource; and
    control means responsive to the orientation and/or movement of the device, the control means includes an accelerometer or an array of accelerometers arranged to sense orientation or movement of the device.

7. A device according to claim 6, wherein the control means is arranged to sense movement of a head end of the device when the device is used as a writing instrument.

8. A hand-held control device for controlling a terminal connectable by a communications network to an addressed resource, the device comprising:
    address input means for scanning a text address of the resource;
    command output means for uploading address information from the device to the terminal and causing the terminal to connect to the addressed resource; and
    control means responsive to the orientation and/or movement of the device, the control means includes an accelerometer or an array of accelerometers arranged to sense orientation or movement of the device, the control means activates a function in accordance with the orientation or movement of the device.

9. A hand-held control device for controlling a terminal connectable by a communications network to an addressed resource, the device comprising:
    address input means for scanning a text address of the resource;
    command output means for uploading address information from the device to the terminal and causing the terminal to connect to the addressed resource;
    control means responsive to the orientation and/or movement of the device, the control means includes an accelerometer or an array of accelerometers arranged to sense orientation or movement of the device, the control means activates a function in accordance with a predetermined sequence of orientations or movements of the device.

10. A hand-held control device for controlling a terminal connectable by a communications network to an addressed resource, the device comprising:
    address input means for scanning a text address of the resource;
    command output means for uploading address information from the device to the terminal and causing the terminal to connect to the addressed resource; and
    wherein a head end of the device includes a stylus.

11. A device according to claim 10, wherein the stylus is retractable.

12. A hand-held control device for controlling a terminal connectable by a communications network to an addressed resource, the device comprising:
    address input means for scanning a text address of the resource;
    command output means for uploading address information from the device to the terminal and causing the terminal to connect to the addressed resource; and
    means for generating a text file as a user writes with the device.

13. A hand-held control device for controlling a terminal connectable by a communications network to an addressed resource, the device comprising:
    address input means for scanning a text address of the resource;

command output means for uploading address information from the device to the terminal and causing the terminal to connect to the addressed resource; and means for generating a graphics file as a user writes or draws with the device.

14. A method of controlling a terminal connectable by a communications network to an addressed resource, the method comprising:

scanning a text address of the resource;

uploading address information to the terminal;

causing the terminal to connect to the addressed resource; and recognizing the nature of the addressed resource from the format of the scanned text address.

15. A method according to claim 14, further comprising retrieving an application launch code suitable to launch an application on the terminal appropriate to the nature of the addressed resource.

16. A method according to claim 15, further comprising appending the application launch code to the address information before upload to the terminal.

17. A method according to claim 16, further comprising storing the address information with an associated application launch code until upload to the terminal.

18. A method of controlling a terminal connectable by a communications network to an addressed resource, the method comprising:

scanning a text address of the resource;

uploading address information to the terminal;

causing the terminal to connect to the addressed resource;

controlling the terminal by a hand-held device that scans the resource address and uploads resource address information to the terminal; and controlling the hand-held device by orientation and/or movement of the device.

19. A method of controlling a terminal connectable by a communications network to an addressed resource, the method comprising:

scanning a text address of the resource;

uploading address information to the terminal;

causing the terminal to connect to the addressed resource;

controlling the terminal by a hand-held device that scans the resource address and uploads resource address information to the terminal; and using the device as a writing instrument and sensing movement of the device to generate a message file.

* * * * *